(12) United States Patent
Seal et al.

(10) Patent No.: US 12,394,292 B2
(45) Date of Patent: Aug. 19, 2025

(54) SYSTEM AND METHOD FOR ALARMS FOR POINT-OF-SALE TERMINAL

(71) Applicant: Shopify Inc., Ottawa (CA)

(72) Inventors: David G. Seal, Ottawa (CA); Daanish Maan, Brampton (CA); Michael Joseph DeFazio, Fonthill (CA)

(73) Assignee: Shopify Inc., Ottawa (CA)

( * ) Notice: Subject to any disclaimer, the term of this patent is extended or adjusted under 35 U.S.C. 154(b) by 422 days.

(21) Appl. No.: 17/894,285

(22) Filed: Aug. 24, 2022

(65) Prior Publication Data

US 2024/0071193 A1  Feb. 29, 2024

(51) Int. Cl.
 G08B 13/26  (2006.01)
 G06Q 20/20  (2012.01)
 G08B 13/24  (2006.01)
 G08B 15/00  (2006.01)

(52) U.S. Cl.
 CPC ......... G08B 13/246 (2013.01); G06Q 20/202 (2013.01); G08B 13/2462 (2013.01); G08B 13/248 (2013.01)

(58) Field of Classification Search
 CPC .............. G08B 13/246; G08B 13/2462; G08B 13/248; G08B 13/2482; G08B 25/005; G06Q 20/202; G07G 1/0036; G07G 3/003
 See application file for complete search history.

(56) References Cited

U.S. PATENT DOCUMENTS

| | | | |
|---|---|---|---|
| 2007/0008102 A1* | 1/2007 | Fallin ...................... | G06Q 20/20 340/506 |
| 2012/0280040 A1* | 11/2012 | Carney ................ | G06Q 20/047 235/383 |
| 2013/0169810 A1* | 7/2013 | Hieronymus ...... | G06Q 20/4016 348/148 |
| 2016/0210604 A1* | 7/2016 | Hayhow ................. | G06Q 20/20 |
| 2022/0223019 A1* | 7/2022 | Shakedd ............ | G08B 13/2417 |

* cited by examiner

*Primary Examiner* — Garcia Ade
(74) *Attorney, Agent, or Firm* — Moffat & Co

(57) ABSTRACT

A loss prevention system including a sensor apparatus within the loss prevention system, the sensor apparatus being configured to detect an anomalous event and provide a signal; and a group of point-of-sale terminals, wherein at least one point-of-sale terminal from the group of point-of-sale terminals is configured to receive the signal; determine that the at least one point-of-sale terminal needs to act on the signal; and perform an action at the at least one point-of-sale terminal based on determining that the at least one point-of-sale terminal needs to act on the signal.

20 Claims, 5 Drawing Sheets

SYSTEM AND METHOD FOR ALARMS FOR POINT-OF-SALE TERMINAL

FIELD OF THE DISCLOSURE

The present disclosure is related to loss mitigation systems in retail establishments, and in particular relates to loss mitigation using point-of-sale terminals.

BACKGROUND

For loss prevention, stores are often equipped with sensors near the exits or in other locations, which will detect tags affixed to merchandise. Such sensors may then cause an alarm to be triggered if such tag passes the sensor. In other cases, the alarms may be caused by the opening of a display cabinet or the removal of a security device.

SUMMARY

In accordance with the embodiments of the present disclosure, a system may be provided in which shoplifting alerts may be targeted, for example, to a user or a group of users that can act on such alert. Such targeting may also have the effect that alarms, which may currently be ignored by salesclerks engaged in check out transactions, may be more likely to be responded to.

In some embodiments, this is accomplished by utilizing a sensor with communication capabilities that can communicate when an alarm is triggered. The communication may be provided to a point-of-sale terminal or to an intermediary computer which may then notify the point-of-sale terminal. Various actions may be taken at the point-of-sale terminal. These and other embodiments are described below.

Therefore, in one aspect, a loss prevention system may be provided. The loss prevention system may comprise a sensor apparatus and at least one point-of-sale terminal from a group of point-of-sale terminals. The sensor apparatus may detect an anomalous event and provide a signal. The at least one point-of-sale terminal from the group of point-of-sale terminals may receive the signal; determine that the at least one point-of-sale terminal needs to act on the signal; and perform an action at the at least one point-of-sale terminal based on determining that the at least one point-of-sale terminal needs to act on the signal.

In some embodiments, the anomalous event may be the detection of a tag affixed to an item leaving a designated area.

In some embodiments the detection of the tag leaving the designated area may comprise detection of the tag passing through a defined security gate.

In some embodiments, the signal may be a broadcast signal to the group of point-of-sale terminals within range of the signal.

In some embodiments, the at least one point-of-sale terminal may be configured to determine that the at least one point-of-sale terminal needs to act on the signal based on at least of: a login status of the at least one point-of-sale terminal; a role of a user logged into the at least one point-of-sale terminal; an item type of an item identified in the signal; an item value of an item identified in the signal; or a location identified in the signal.

In some embodiments, the signal may be provided to the at least one point-of-sale terminal via a server.

In some embodiments, the at least one point-of-sale terminal may be configured to determine that the at least one point-of-sale terminal needs to act on the signal based on receipt of the signal from the server.

In some embodiments, the action may comprise providing at the at least one point-of-sale terminal an alert using a user interface.

In some embodiments, the at least one point-of-sale terminal may receive security camera footage, and where the alert may include displaying security camera footage of the anomalous event.

In some embodiments, the alert may be escalated until an input is received by at least one point-of-sale terminal indicating a user is taking responsibility for the anomalous event.

In some embodiments, the alert may be cleared at the at least one point-of-sale terminal when an input is received by another one of the group of point-of-sale terminals indicating a user is taking responsibility for the anomalous event.

In some embodiments, the action may comprise locking a user interface of the at least one point-of-sale terminal until an input is received by another one of the group of point-of-sale terminals indicating a user is taking responsibility for the anomalous event.

In another aspect, a method for loss prevention may be provided. The method may include detecting an anomalous event at a sensor apparatus within a loss prevention system and providing a signal related to the anomalous event. The method may further include receiving the signal at at least one point-of-sale terminal within a group of point-of-sale terminals and determining, at the at least one point-of-sale terminal, that the at least one point-of-sale terminal needs to act on the signal. The method may further include performing an action at the at least one point-of-sale terminal based on determining that the at least one point-of-sale terminal needs to act on the signal.

In some embodiments, the anomalous event may be the detection of a tag affixed to an item leaving a designated area.

In some embodiments, the detection of the tag leaving the designated area may comprise detection of the tag passing through a defined security gate.

In some embodiments, the determining that the at least one point-of-sale terminal needs to act on the signal may be based on at least of: a login status of the at least one point-of-sale terminal; a role of a user logged into the at least one point-of-sale terminal; an item type of an item identified in the signal; an item value of an item identified in the signal; or a location identified in the signal.

In some embodiments, the action may comprise providing at the at least one point-of-sale terminal an alert using a user interface.

In some embodiments, the at least one point-of-sale terminal may receive security camera footage, and where the alert includes displaying security camera footage of the anomalous event.

In some embodiments, the method may include escalating the alert until an input is received by at least one point-of-sale terminal indicating a user is taking responsibility for the anomalous event.

In a further aspect, a non-transitory computer readable medium for storing instruction code may be provided. The instruction code, when executed by a processor in a loss prevention system, may cause the loss prevention system to: detect an anomalous event at a sensor apparatus within a loss prevention system and provide a signal related to the anomalous event. The instruction code, when executed by a processor, may further cause the loss prevention system to receive the signal at at least one point-of-sale terminal within a group of point-of-sale terminals, determine, at the at least one point-of-sale terminal, that the at least one point-of-sale terminal needs to act on the signal, and perform an action at the at least one point-of-sale terminal based on determining that the at least one point-of-sale terminal needs to act on the signal.

BRIEF DESCRIPTION OF THE DRAWINGS

The present disclosure will be better understood with reference to the drawings, in which.

DETAILED DESCRIPTION

Figure 1:
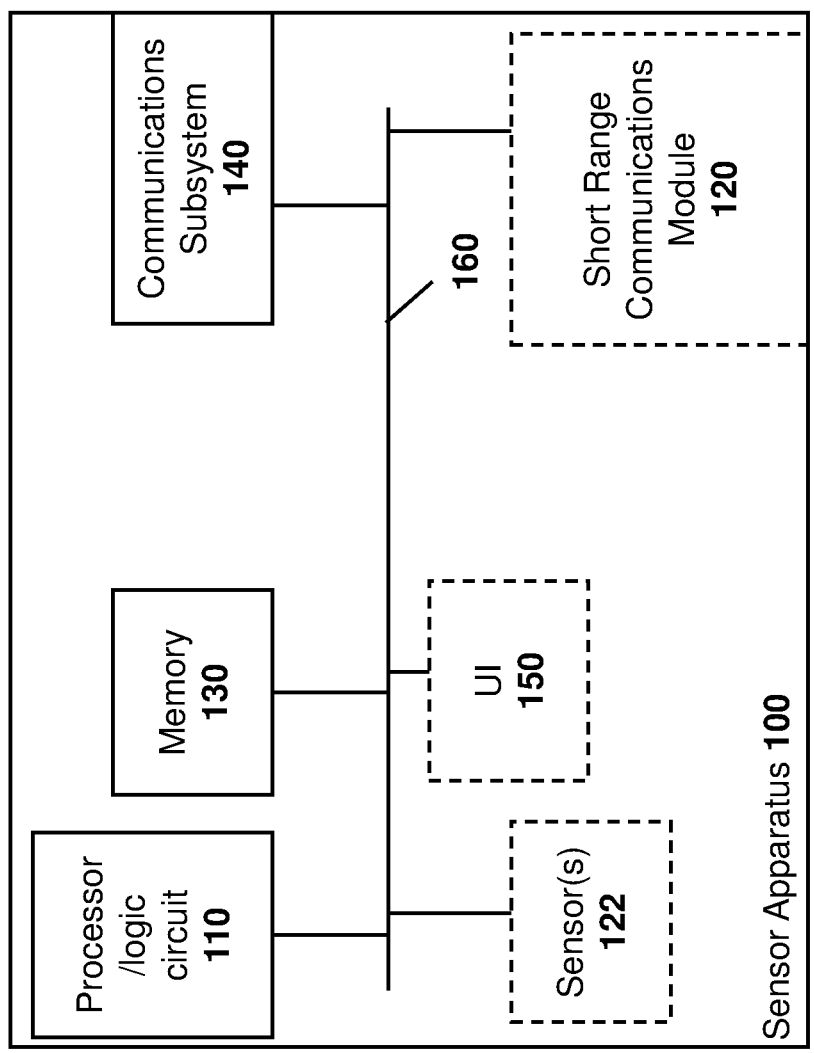
FIG. 1 is a block diagram showing an example sensor apparatus capable of being used with the embodiments of the present disclosure

The present disclosure will now be described in detail by describing various illustrative, non-limiting embodiments thereof with reference to the accompanying drawings and exhibits. The disclosure may, however, be embodied in many different forms and should not be construed as being limited to the illustrative embodiments set forth herein. Rather, the embodiments are provided so that this disclosure will be thorough and will fully convey the concept of the disclosure to those skilled in the art.

The present disclosure is directed at a loss prevention system. As used herein, a loss prevention system may aim to prevent, avoid, and/or mitigate losses such as, for example in retail environments, due to factors such as, for example theft (sometimes referred to as "shrink" or "shrinkage"). The term loss prevention and loss mitigation may be used interchangeably herein.

In a typical storefront, when a merchandise tag passes through a security gate, this may cause an alarm to sound. For example, the tag may be an acousto magnetic (AM) tag or a radio frequency (RF) tag that may resonate based on a particular frequency emitted by a transmitter associated with the security gate and the resonance may be detected by a sensor at the security gate. In other cases, merchandise may be equipped with a radio frequency identifier (RFID) tag, which may return information about the tag to the sensor. In other cases, the sensor may be a tether comprising a closed circuit holding merchandise to a particular area in the store, such as a display counter. In other cases, the sensor may be a contact sensor on a cabinet. Other options are possible.

In most current systems, the detection of the signal or information by the sensor, or the breaking of the circuit, may be seen as an abnormal condition, and cause an audible alarm to sound and/or lights to flash. However, in some cases, if the occurrence of the abnormal condition occurs frequently, staff at the store may start to ignore such signals, which would typically reset after a predetermined time period.

Further, in some cases storefronts find audible and visual alarms undesirable as they may leave a negative impression with the other patrons of the storefront.

Therefore, in accordance with the embodiments of the present disclosure, a more discreet system may be provided that may be more difficult to ignore. In particular, a computing device associated with a point-of-sale terminal may be configured to receive, from a sensor apparatus, a signal indicating that an abnormal condition has occurred. For example, in some embodiments, the sensor apparatus may be a gate at an entrance or an exit to a storefront, and the abnormal condition may be the detection of a merchandise tag passing through such gate. In other cases, the abnormal condition may be the breaking of a circuit on a sensor securing merchandise to a display counter or the opening of a cabinet. Other options for sensors are possible.

In some embodiments, based on the receipt of the signal from the sensor apparatus, the computing device may decide whether it needs to act on the signal. For example, the decision on whether to act on the signal may be based on a role of a user logged into the computing device. In some cases, ongoing transactions may be reviewed and based on predetermined criteria a decision may be made that the computing device needs to act on the signal or that the computing device can ignore the signal. In some cases, proximity or physical location may be used to determine if an action should be taken. In some cases, other filtering criteria may be used.

When the computing device needs to act on the signal, the computing device may then perform an action, such as providing, on a display, a notification of alarm conditions, locking a point-of-sale terminal, displaying video taken from security cameras, and/or providing other audio, visual or haptic feedback to a user of the point-of-sale terminal.

In some cases, the action may be escalated until someone takes responsibility for the alert.

Each is described below.

Computer System

As used in the present disclosure, a computer system comprises at least a sensor apparatus that has communication capabilities, along with a computing device capable of receiving communications. The computing device may for example be one or more point-of-sale terminals in a retail environment. However, while the present disclosure is illustrated with regard to retail environments and point-of-sale terminals, this is not limiting, and the methods and systems of the present disclosure could equally be used in other environments.

In some cases, a server or other computing device may further be used. The server or computing device may be implemented as a single device, or, for example, may be a distributed computing system. In this case, signals from the sensor apparatus may be routed to the server instead of directly to the point-of-sale terminal(s), or in addition to routing the signals to the point-of-sale terminal(s). The server may then make decisions on which point-of-sale terminal(s) to send the signal to, and/or what action should be taken.

Sensors

In one example, at least a subset of the items in the store may have a tag associated with them. For example, such tag may be an acousto magnetic (AM) tag or a radio frequency (RF) tag that may resonate based on a particular frequency emitted by a transmitter associated with the sensor. The sensor may detect the resonance and cause an alarm to be triggered.

In other cases, a tag associated with at least a subset of items in the store may include a radio frequency identification (RFID) tag that can uniquely identify such item. In this case, a transmitter may cause the RFID circuit in the tag to be powered and this circuit may provide a unique identifier to the sensor, which may then cause the alarm to be triggered.

In other cases, the sensor may be associated with a display case or a tamper prevention device, which may detect that such display case or tamper prevention device has been compromised and trigger the alarm.

In other cases, the sensor apparatus may be part of a loss prevention system, and have other sensors such as cameras, pressure sensors, infrared sensors, among others associated with it.

Reference is now made to FIG. 1. In the embodiment of FIG. 1, a sensor apparatus 100 comprises a processor or logic circuit 110. In the case of an AM or RF tag system, the sensor apparatus 100 may have a short range communications module 120 which has both a transmitter that is capable of sending a signal at a particular frequency and a receiver for receiving signals based on the resonance of the tag. For example, some acousto magnetic systems operate at 58 kHz and RF systems may operate at 8.2 MHz.

Retailers may affix tags or security labels to retail items, where such tags or labels have tiny circuits that resonate at the frequency emitted by the sensor apparatus. For example, such sensor apparatus may be located at the entrance or exit of the retail location, at the entrance or exit of a particular section of the retail location, among other options. In security gate configurations, one pedestal may act as a transmitter while the other may act as a receiver. In other cases, a single pedestal antenna may be used to both send and receive the signal. For example, this may be implemented using pulsed RF technology.

In other embodiments the short range communications module 120 may emit a signal and a receiver may detect an RFID signal sent by a tag affixed to merchandise.

In other embodiments, for example where a closed circuit tether system is used to affix a product to a display location, a sensor 122 may instead be used to sense when a circuit is broken.

In some embodiments, sensors 122 may include contact sensors.

In some embodiments, sensors 122 may include cameras or other sensors.

In some cases, the sensor apparatus may have a very simple logic circuit with the programmable logic hardwired therein. In other cases, a memory 130 may be used to store instructions.

In accordance with the embodiments of the present disclosure, sensor apparatus 100 includes a communications subsystem 140 that is capable of communicating with at least one computing device. Communication subsystem 140 could use any communication technology, whether wired or wireless. For example, if sensor apparatus 100 is connected to a server, communication subsystem 140 may include an Ethernet connection to the server. In other cases, communication subsystem 140 may be a wireless communication subsystem and may for example use a Wi-Fi chipset. In other cases, communication subsystem 140 may broadcast signals and, for example, use a Bluetooth or a Bluetooth Low Energy (BLE) chipset to add information to the Bluetooth or BLE broadcast. Other examples are possible.

In some cases, sensor apparatus 100 may include a user interface 150. For example, such user interface may be a light or series of lights, a speaker to emit an audio alert, among other options.

In some cases, communications between the various components of sensor apparatus 100 may be through a bus 160. However, this is optional, and in some cases the communications may be direct.

In practice, the sensor apparatus is configured to detect an abnormal condition (such as a tag passing through a gate or a tether being removed or cut), and such detection causes a signal to be sent by the sensor apparatus.

In one embodiment, such signal may be a broadcast signal that can be detected by computing devices within range of such signal.

In one embodiment, this signal may be a signal sent specifically to a computing device such as a server, which may then re-distribute the signal to other computing devices such as point-of-sale terminals.

In one embodiment, the signal may be sent directly to computing devices that have been designated at the sensor apparatus to receive such signals. For example, a sensor apparatus comprising a gate at an exit of a retail establishment may have preprogrammed therein the addresses of point-of-sale terminals in proximity to the gate.

Point-of-Sale Terminal(s)

In some embodiments, the point-of-sale terminal may be a computing device or part of a computing system capable of performing the embodiments of the present disclosure. Such point-of-sale terminal may be fixed or may be portable and capable of being carried by a sales associate.

Figure 2:
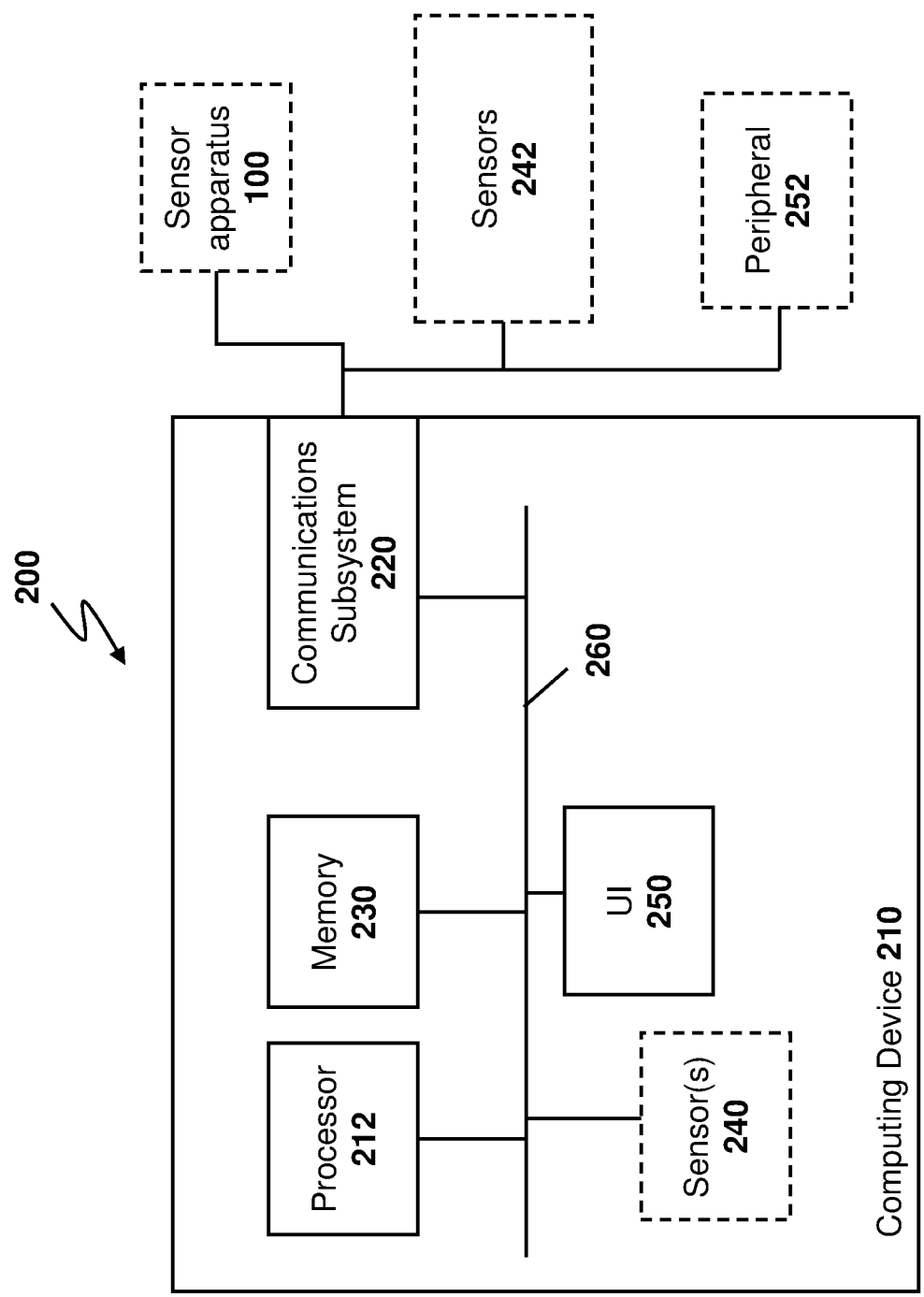
FIG. 2 is a block diagram showing an example computer system capable of being used with the embodiments of the present disclosure.

Reference is now made to FIG. 2, which shows an example, simplified, computing system 200. In the example of FIG. 2, a computing device 210 may include a processor 212 and a communications subsystem 220, where the processor 212 and the communications subsystem 220 cooperate to perform the methods of the embodiments described herein.

Processor 212 is a hardware processor configured to execute programmable logic, which may be stored, along with data, on computing device 210 and shown in the example of FIG. 2 as memory 230. Memory 230 can be any tangible, non-transitory computer readable storage medium such as optical (e.g., CD, DVD, etc.), magnetic (e.g., tape), flash drive, hard drive, or other memory known in the art.

Alternatively, or in addition to memory 230, computing device 210 may access data or programmable logic from an external storage medium, for example through communications subsystem 220.

Communications subsystem 220 allows computing device 210 to communicate with other devices or network elements and the design of communications subsystem 220 may be based on various types of communications being performed. Further, communications subsystem 220 may comprise a plurality of communication technologies, including any wired or wireless communication technology.

In some cases, communications subsystem 220 may therefore allow communications with other devices such as network servers, whether local or remote. Further, communications subsystem 220 may allow communications between computing device 210 and a sensor apparatus 100.

In some cases, sensors may be associated with the computing device 210. Such sensors may be internal sensors, shown as sensors 240 in the embodiment of FIG. 2. In other cases, the sensors may be external and are shown as sensors 242 in the embodiment of FIG. 2. In certain circumstances, a combination of internal and external sensors may also be used with computing device 210 within computer system 100.

In the embodiment of FIG. 2, computing device 210 further includes a user interface (UI) 250. The user interface 250 can be any auditory, visual or a haptic feedback mechanism to provide a user with information. For example, user interface 250 could be a display screen, light, speaker, vibration mechanism, among other options.

In some cases, the UI 250 could include a touch screen to allow user interaction with the computing device 210. In some cases, the UI could include a keyboard, keypad, smart pen, or other input device.

In some cases, other peripherals 252 could be associated with computer system 200. For example, a cash drawer may be one such peripheral. In other cases, receipt printers may be a peripheral. In other cases, payment devices may be a peripheral. However, this is not meant to be limiting and a point-of-sale terminal or similar computing system may have other peripherals.

Communications between the various modules within a computing device can be done in a variety of ways. In the example of FIG. 2, a bus 260 is shown to allow communications between the various modules. However, this is merely provided for illustration purposes and other types of communication between modules is possible.

Figure 3:
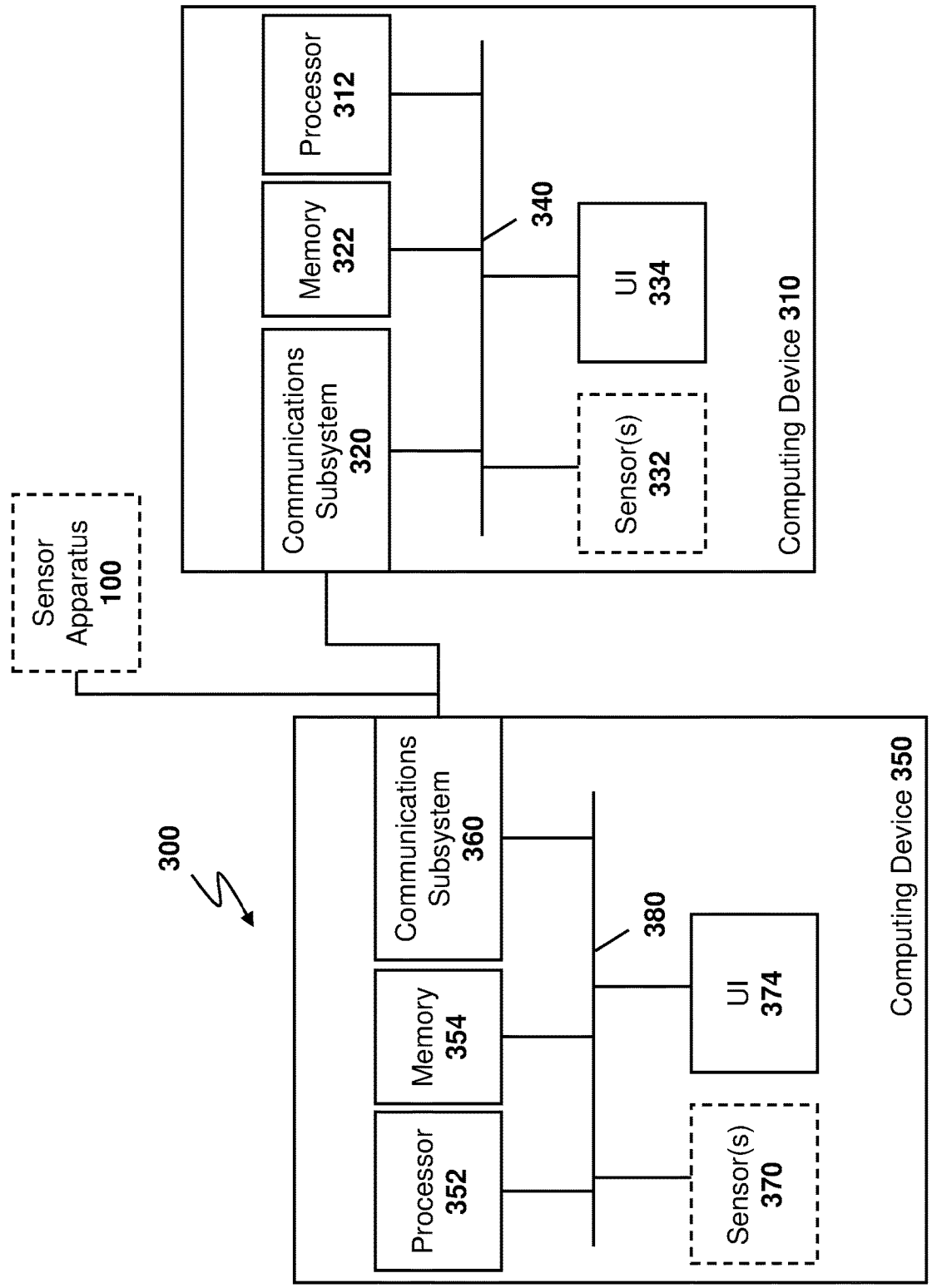
FIG. 3 is a block diagram showing a further example computer system capable of being used with the embodiments of the present disclosure.

While the embodiment of FIG. 2 shows a single computing device with internal or external sensors and/or internal or external short-range communications modules, in other cases, a plurality of computing devices may exist within a computer system. Reference is now made to FIG. 3.

In the example of FIG. 3, a simplified computing system 300 having a first computing device 310 and a second computing device 350 is shown. In particular a computing device 310 may be associated with a point-of-sale terminal and be similar to computing device 210 from FIG. 2. Computing device 310 includes a processor 312 and a communications subsystem 320, where the processor 312 and the communications subsystem 320 cooperate to perform the methods of the embodiments described herein.

Processor 312 is a hardware processor configured to execute programmable logic, which may be stored, along with data, on computing device 310 and shown in the example of FIG. 3 as memory 322. Memory 322 can be any tangible, non-transitory computer readable storage medium such as optical (e.g., CD, DVD, etc.), magnetic (e.g., tape), flash drive, hard drive, or other memory known in the art.

Alternatively, or in addition to memory 322, computing device 310 may access data or programmable logic from an external storage medium, for example through communications subsystem 320.

Communications subsystem 320 allows computing device 310 to communicate with other devices or network elements and the design of communications subsystem 320 may be based on various types of communications being performed. Further, communications subsystem 320 may comprise a plurality of communication technologies, including any wired or wireless communication technology.

Other sensors may be associated with the computing device 310. Such sensors may be internal sensors, shown as sensors 332 in the embodiment of FIG. 3. In other cases, the sensors may be external to the computing device. In certain circumstances, a combination of internal and external sensors may also be used with computing device 310.

In one embodiment of FIG. 3, computing device 310 further may include a user interface (UI) 334. The user interface 334 can be any auditory, visual or a haptic feedback mechanism to provide a user with information. For example, user interface 334 could be a display screen, light, speaker, vibration mechanism, among other options.

In some cases, the UI 334 could include a touch screen to allow user interaction with the computing device 310. In some cases, the UI could include a keyboard, keypad, smart pen, or other input device.

In some cases, other peripherals (not shown) could be associated with computer system 300. For example, a cash drawer may be one such peripheral. In other cases, receipt printers may be a peripheral. However, this is not meant to be limiting and a point-of-sale terminal or similar computing system may have other peripherals.

Communications between the various modules within the computing device 310 can be done in a plurality of ways. In the example of FIG. 3, a bus 340 is shown to allow communications between the various modules. However, this is merely provided for illustration purposes and other types of communication between modules is possible.

Further, in the embodiment of FIG. 3, a second computing device 350 is provided. Computing device 350 may be an external computing device that is somehow associated with the computing device 310. For example, computing device 350 may be a computing device for an operator, including a mobile device or tablet that is somehow associated with a stand-alone point-of-sale terminal. In other examples, computing device 350 may be a network server that is used to perform various processing as described below, or is provided as a backend for a particular computing system. For example, in some cases, computing device 350 may be used to perform image processing. In other cases, computing device 350 may be a security system computing device associated with security staff. Other examples are possible.

As with computing device 310, computing device 350 may include a processor 352 and a communications subsystem 360, where the processor 352 and communications subsystem 360 cooperate to perform the methods of the present disclosure.

Processor 352 may use programmable logic to execute instructions stored in a memory 354. Further memory 354 may store other data and may be any non-transitory computer storage medium.

In some embodiments, computing device 350 includes sensors 370 internal to the computing device or sensors (not shown) external to the computing device. Such sensors may be similar to sensors 240 or sensors 242 from the embodiment of FIG. 2.

Further, in some cases computing device 350 may include a user interface 374 which may be used to provide visual, auditory or haptic feedback to a user of computing device 350. In this case, the user of computing device 350 may be different from the person near computing device 310. For example, in some cases the user of computing device 350 may be a security staff member for a building, a technology support person, a store manager or other store clerk, among other options. Other examples are possible.

In the embodiment of FIG. 3, communications between various modules are provided using bus 380. Again, communications between modules can be done in a variety of ways and bus 380 illustrates only a possible example.

Communications between computing device 310 and computing device 350 may occur through various mechanisms. For example, communications subsystem 320 may communicate with communications subsystem 360 through a wired or wireless connection such as ethernet, RF, Bluetooth, Wi-Fi, USB, other serial port, among others. In other cases, communications subsystem 320 may communicate through a network such as, for example, the Internet, among other similar options, with communications subsystem 360. In this case, each of communications subsystems 320 and 360 may use wired or wireless communications to communicate with a router which may then route the communications over such a network. Such communications may include but are not limited to cellular, satellite, Wi-Fi, ethernet, fiber, among others.

A sensor apparatus may communicate with computing device 350 using communications subsystem 360 in some embodiments.

In some cases, the embodiments of FIG. 2 or FIG. 3 could be combined, or more or fewer computing devices could be included in a computer system. The present disclosure is not limited to the embodiments of FIGS. 2 and 3, which are provided to illustrate examples of various computing systems.

Broadcasting Signal

Utilizing a sensor apparatus and computer system such as those described above with regard to FIGS. 1, 2 and 3, a loss prevention system may be provided which is more discreet in some cases, and which may ensure an anomalous event is acted on in some cases.

Figure 4:
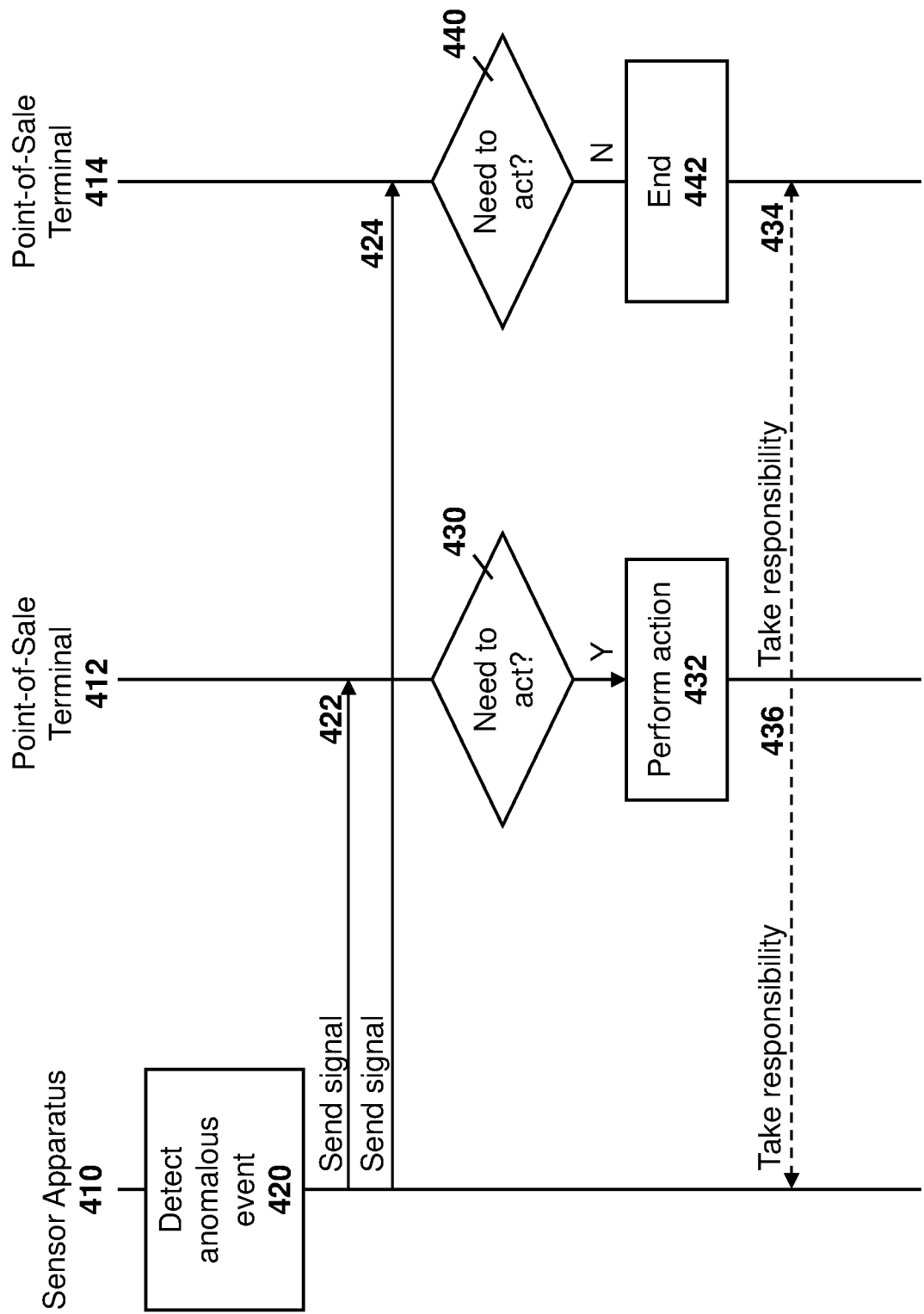
FIG. 4 is a dataflow diagram showing a method for detecting an anomalous event and providing a signal to at least one point-of-sale terminal and determining whether the point-of-sale terminal needs to act on the signal.

In particular, reference is now made to FIG. 4. In the embodiment of FIG. 4, a sensor apparatus 410 may communicate with a point-of-sale terminal 412 and a point-of-sale terminal 414. The communication with only two point-of-sale terminals is provided for illustration purposes only and in practice the sensor apparatus may communicate with only one point-of-sale terminal or may communicate with two or more point-of-sales terminals.

Sensor apparatus 410 may be the sensor apparatus from the embodiment of FIG. 1. As such, sensor apparatus 410 may detect an anomalous event as shown at block 420. For example, the anomalous event may include an AM or RF tag being brought through a gate. The anomalous event may include an RFID tag being brought in proximity to a sensor. The anomalous event may include a tether being disconnected or a contact being broken. The anomalous event may be the detection through video processing of a product being removed from a storefront without being purchased. Other options for the anomalous event at block 420 may further exist.

In the embodiment of FIG. 4, once the anomalous event has been detected at block 420, the sensor operators 410 a may send or broadcast a signal. The sending is shown with signal 422 being received at point-of-sale terminal 412 and signal 424 being received at point-of-sale terminal 414. As will be appreciated by those in the art, signal 422 and signal 424 may be the same signal which may be received by the different point-of-sale terminals, for example during a broadcast. In other cases, signals 422 and 424 may be separate and be sent directly or indirectly to point-of-sale terminals.

If signals 422 and/or 424 are broadcast signals, the broadcast may be over any wired or wireless communication channel. For example, the broadcast may be over RF, Bluetooth, Bluetooth low energy, Wi-Fi, cellular or other similar technology. In some embodiments, the broadcast signal may include information being placed in the header of the broadcast signal so that a connection does not need to be made between the sensor apparatus 410 and the point-of-sale terminals 412 and 414. In other cases, the signal may indicate that a connection needs to be established between the sensor apparatus and the point-of-sale terminal prior to information being exchanged with the sensor apparatus.

In other cases, a connection may already exist between the sensor apparatus 410 and each of point-of-sale terminals 412 and 414. In this case, signals 422 and 424 may be dedicated signals sent directly to each of the point-of-sale terminals. Other options are possible.

Various information may be provided in signals 422 and 424 (or if a connection needs to be established, then such information may be provided in subsequent communications). In one embodiment, the signals 422 and 424 may merely provide an indication that an anomalous event has been detected, along with identifying information for sensor apparatus 410. In some cases, additional information such as timestamps, other sensor information available to sensor apparatus 410, among other information may be included in signals 422 and 424.

If sensor apparatus 410 is an RFID reader, information from the tag that is read may also be included within broadcast signals 422 and 424. Such information may include the item to which the tag was affixed if the sensor apparatus 410 has access to such information. In other cases, an identifier for the RFID tag may be provided in the broadcast signal 422 and 424, and the tag identifier may then be used to look up the information of the product related to the tag at the point-of-sale terminals.

In some cases, the signals 422 or 424 may be signed to ensure authenticity of such signal. In this case, a public key for the sensor apparatus 410 may be known at point-of-sale terminals 412 or point-of-sale terminal 414 in order to verify the communication.

In some cases, signal 422 may be encrypted with a public key for point-of-sale terminal 412 and signal 424 may be encrypted with a public key of point-of-sale terminal 414. In this case, sensor apparatus 410 would need to know where each signal is being sent and would need to be preconfigured with the public keys of the various destination computing devices.

On receiving signal 422, point-of-sale terminal 412 makes a decision at block 430 on whether the point-of-sale terminal needs to act on the signal.

In particular, the point-of-sale terminal 412 may filter the signal to determine whether the signal should be acted on. In some cases, a user, such as a sales clerk, may be logged in to the point-of-sale terminal. Such user would have particular roles. If one of the roles for the user is security, loss prevention, management, among other designated rules, then the point-of-sale terminal may determine that the signal should be acted on. Therefore, in some embodiments, the decision at block 430 may be based on a role of a user logged into the point-of-sale terminal.

In some cases, the signal may include identification information for the product that caused the alarm. For example, this may be the case when the item was tagged with an RFID tag and therefore the item can be identified. In this case, the determination of whether to perform an action at the point-of-sale terminal could depend on the item. In particular, if the item has been listed as sold, this may indicate that the tag was not removed from the item and in some cases no action may be taken at the point-of-sale terminal (in other cases an action to direct a sales clerk to remove the tag may occur, or if the customer is known then a notification may be sent to the customer).

Further, in some cases if the identified item does not meet a threshold value, is not of a specific type, among other options, then the point-of-sale terminal may ignore the signal. For example, if the tagged item is a low value item, it may be determined at the point-of-sale terminal that the current transaction of that point-of-sale terminal is involved with is more important than the identified item, and therefore no action may be needed.

In some cases, if the point-of-sale terminal is involved in a transaction that exceeds a threshold value, then the point-of-sale terminal may ignore the alert, regardless of whether the item can be identified.

In some cases, supplemental information may be received at the point-of-sale terminal 412 which may be used in the determination at block 430. For example, the signal indicating an anomalous event may have been sent to a server or other computing device controlling the security camera footage, and such computing device may then perform image processing to determine the item that caused the alert. The computing device performing the video processing may then provide information to the various point-of-sale terminals indicating the type of item that caused the alert, the value of the item that caused the alert, or other information about the item that caused the alert.

Therefore, the determination at block 430 may take into account the value of the item causing the alert and/or a value of a current transaction that the point-of-sale terminal is involved with.

In some cases, the location of the point-of-sale terminal may be used to make a decision at block 430. For example, if point-of-sale terminal 412 is mobile and exceeds a threshold distance from the sensor apparatus 410, then the point-of-sale terminal 412 may ignore the received signal in some cases. This determination may be based on a current location known at the point-of-sale terminal, for example utilizing various position or location based technologies, along with the identifier of the sensor apparatus 410 that is providing the signal or alert. The point-of-sale terminal 412 may have knowledge of the physical locations of the various sensor apparatuses within the retail location in order to calculate the distance from such sensor apparatus.

If the decision at block 430 finds that the point-of-sale terminal should not ignore the signal, an action as described below may be taken.

For example, the process at the point-of-sale terminal 412 may proceed from block 430 to block 432. At block 432, the point-of-sale terminal may perform an action.

In one embodiment, the action at the point-of-sale terminal may be to provide a user of the point-of-sale terminal with a visual, auditory, or haptic feedback. For example, a pop up window may appear on the display of point-of-sale terminal 412. Such pop up window may indicate that an anomalous event has occurred, the location of the anomalous event, and/or a timestamp for the anomalous event, among other information.

In some cases, rather than a pop up window, the entire screen may change colors, text displayed on the screen may flash, the window of the screen may be superseded by an alert window, among other options.

In some cases, point-of-sale terminal 412 may receive information from other computing devices, such as from a security computer providing security camera footage of the anomalous event. In this case, the security camera footage may be played on the point-of-sale terminal 412.

In some cases, for example if point-of-sale terminal 412 is a portable device, other sensory outputs such as vibration or other haptic feedback mechanisms may be used to draw the user's attention to the computing device.

In other cases, the action may be to lock the point-of-sale terminal.

In some cases, the action may persist until a user within the storefront takes responsibility for the anomalous event. Thus, for example, the screen of a plurality of point-of-sale terminals may lock, and only after at least one user has taken responsibility for dealing with the anomalous event will the remaining screens of the point-of-sale terminals unlock.

Similarly, the screen of a point-of-sale terminal may remain in an alert colour, text may remain flashing, or other changes to the user interface of the point-of-sale terminal may remain until a user within the storefront has taken responsibility for dealing with the anomalous event. In this way, ignorance of the alert is more difficult.

Further, in some cases the action may escalate over time until a user has taken responsibility for the anomalous event. For example, a pop up or a change in the colour of text at the point-of-sale terminal may be a first level. The point-of-sale terminal 412 may be programmed to escalate the actions though if a communication has not been received by the point-of-sale terminal 412 that someone else is taking responsibility for the anomalous event. For example, after a predetermined time period then a further action may be taken. For example, a second level may be a pop up indicating that no one has yet taken responsibility for the anomalous event and the user of the point-of-sale terminal may be forced to indicate whether he or she will take responsibility in the pop up window before being allowed to proceed back to the normal checkout screen.

In some cases, the escalation may include locking of the terminals until someone takes responsibility.

As will be appreciated by those skilled in the art, the escalation requires communication between the various point-of-sale terminals. Such communication may utilize the communication subsystems of the point-of-sale terminals and broadcast or direct signals may be sent between such point-of-sale terminals to indicate that a user is taking responsibility for the anomalous event.

Further, in some cases the sensor apparatus 410 may be the arbiter and may therefore receive communications from the point-of-sale terminal and indicate whether someone has taken responsibility to the other point-of-sale terminals.

In some cases, rather than a time period expiring, escalation may be based on a signal from another computing device. For example, sensor apparatus 410 may arbitrate whether someone has taken responsibility and send further signals to the various point-of-sale terminals to indicate that escalation is required if nothing has been received at sensor apparatus 410 to indicate that a user has provided an input to a point-of-sale terminal that responsibility is being assumed for the anomalous event.

In some cases, the action at the point-of-sale terminal 412 is used instead of audio or visual alerts at the sensor apparatus 410. This makes the alarm system more discreet. However, in some cases, the action at the point-of-sale terminal may be accompanied by a visual or auditory alarm at the sensor apparatus 410.

Further, point-of-sale terminal 412 may signal to one or more computing devices and/or sensors that it is taking responsibility for the anomalous event, shown with messages 434 and 436 in the embodiment of FIG. 4. In some cases this may clear the alert from the other point-of-sale terminals, unlock the other point-of-sale terminals, among other actions.

For the point-of-sale terminal on which the user indicated that he or she was taking responsibility, other actions may be required. For example, the screen on this computing device may stay locked until the event has been dealt with in some cases. The user may then, in some cases, need to fill out a few fields to log the event. In other cases, the user can merely let the point-of-sale terminal know that the event has been dealt with, for example using a button on the user interface, and the point-of-sale terminal will resume normal operation.

Conversely, point-of-sale terminal 414 receives signal 424 and makes a determination at block 440 that no action needs to be taken. For example, the role of the operator of point-of-sale terminal 414 may be such that the operator or user does not have a role in store security. In other cases, the point-of-sale terminal 414 may be mobile and may be too far away to effectively act on an alert. In other cases, the point-of-sale terminal 414 may be involved in a high value transaction and therefore a determination may be made that the operator of point-of-sale terminal 414 should not be disturbed. Other options are possible.

Based on the determination at block 440, the process proceeds to block 442 and ends for the point-of-sale terminal 414.

Therefore, based on the example of FIG. 4, a sensor apparatus may detect an anomalous event, and provide messages or signals to various point-of-sale terminals that the anomalous event has occurred. In this case, the point-of-sale terminal can decide whether it needs to act on such signal and if yes, an action may be performed at the point-of-sale terminal. Such action may be escalated until someone takes responsibility for the anomalous event in some cases.

Server

In a further embodiment, a sensor apparatus 510 may communicate with a computing device 512, such as a server. The computing device 512 may then communicate with various point-of-sale terminals, including point-of-sale terminal 514 and point-of-sale terminal 516.

Sensor apparatus 510 may be the sensor apparatus from the embodiment of FIG. 1. As such, sensor apparatus 510 may detect an anomalous event as shown at block 520. For example, the anomalous event may include an AM or RF tag being brought through a gate. The anomalous event may include an RFID tag being brought in proximity to a sensor. The anomalous event may include a tether being disconnected or a contact being broken. The anomalous event may be the detection through video processing of a product being removed from a storefront without being purchased. Other options for the anomalous event at block 520 may further exist.

Figure 5:
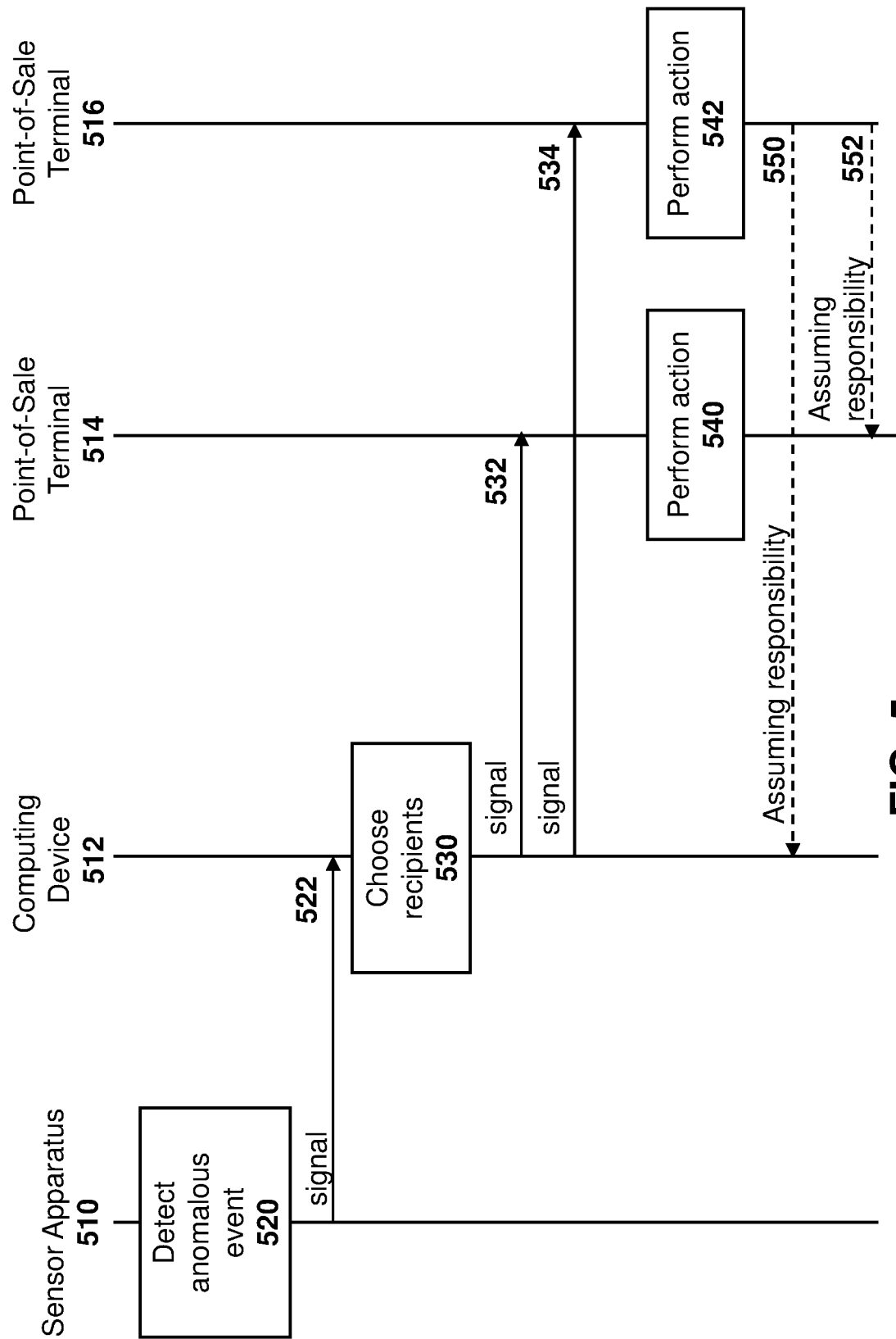
FIG. 5 is a dataflow diagram showing a method for detecting an anomalous event and providing a signal to a computing device which can then choose recipients to perform an action.

In the embodiment of FIG. 5, once the anomalous event has been detected at block 520, the sensor operators 510 a may send a signal to computing device 512. The sending is shown with signal 522 being received at computing device 512.

Signal 522 may be sent over any wired or wireless communication channel. For example, the signal may be sent over an RF, Bluetooth, Bluetooth low energy, Wi-Fi, cellular or other similar channel. In some embodiments, the broadcast signal may include information being placed in the header of the broadcast signal so that a connection does not need to be made between the sensor apparatus 510 and the computing device 512. In other cases, the signal may indicate that a connection needs to be established between the sensor apparatus and the computing device 512 prior to information being exchanged with the sensor apparatus.

In other cases, a connection may already exist between the sensor apparatus 510 and computing device 512, and thus signal 522 may be a dedicated signal sent directly to the computing device.

Other options are possible.

Various information may be provided in signal 522 (or if a connection needs to be established, then such information may be provided in subsequent communications). In one embodiment, the signal 522 may merely provide an indication that an anomalous event has been detected, along with identifying information for sensor apparatus 510. In some cases, additional information such as timestamps, other sensor information available to sensor apparatus 510, among other information may be included in signal 522.

If sensor apparatus 510 is an RFID reader, information from the tag that is read may also be included within signal 522. Such information may include the item to which the tag was affixed if the sensor apparatus 510 has access to such information. In other cases, an identifier for the RFID tag may be provided in the signal 522, and the tag identifier may then be used to look up the information of the product related to the tag at the computing device 512.

In some cases, the signal 522 may be signed to ensure authenticity of such signal. In this case, a public key for the sensor apparatus 510 may be known at computing device 512 in order to verify the communication.

In some cases, signal 522 may be encrypted with a public key for computing device 512.

Based on signal 522, computing device 512 may, at block 530, choose recipients to receive the signal. In particular, computing device 512 may decide that certain point-of-sale terminals are appropriate to receive the signals based on the role of the user logged into such point-of-sale terminals, the location of such point-of-sale terminals, the type/value of the transaction a point-of-sale terminal is involved with, among other factors. Such information may, for example, be reported to computing device 512 by the various point-of-sale terminals on an ongoing basis, so that computing device 512 knows the status of the various point-of-sale terminals.

In some cases, the decision at block 530 may supersede any determining step at an individual point-of-sale terminal. That is, the decision at computing device 512 may be made for the point-of-sale terminals, and therefore any communication from the computing device 512 to the point-of-sale terminal may be an indication that an action should be performed. In other cases, the point-of-sale terminal may further decide whether it should act on the signal.

Thus, computing device 512 may choose point-of-sale terminal 514 and point-of-sale terminal 516 as needing to take action. In this case, signal 532 may be sent to point-of-sale terminal 514 and signal 534 may be sent to point-of-sale terminal 516. In some cases, signal 532 and 534 may be broadcast signals with information directed to the point-of-sale terminals which should act on such signal. For example, the signal may have fields indicating which point-of-sale terminal should act on the signal.

In other cases, signals 532 and 534 may be dedicated signals that are addressed to the particular point-of-sale terminal. Other options are possible.

On receiving signal 532, point-of-sale terminal 514 may perform an action, as shown at block 540. Similarly, point-of-sale terminal 516 may perform an action when receiving signal 534, shown at block 542.

In one embodiment, the action at the point-of-sale terminal may be to provide a user of the point-of-sale terminal with a visual, auditory, or haptic feedback. For example, a pop up window may appear on the display of point-of-sale terminal 514 or 516. Such pop up window may indicate that an anomalous event has occurred, the location of the anomalous event, and/or a timestamp for the anomalous event, among other information.

In some cases, rather than a pop up window, the entire screen may change colors, text displayed on the screen may flash, the window of the screen may be superseded by an alert window, among other options.

In some cases, computing device 512 may have access to security camera footage, and provide such footage in signals 532 and 534. In this case, the security camera footage may be played on the point-of-sale terminals 514 and 516.

In some cases, for example if point-of-sale terminal 514 or 516 is a portable device, other sensory outputs such as vibration or other haptic feedback mechanisms may be used to draw the user's attention to the computing device.

In other cases, the action may be to lock the point-of-sale terminal.

In some cases, the action may persist until a user within the storefront takes responsibility for the anomalous event. Thus, for example, the screen of a plurality of point-of-sale terminals may lock, and only after at least one user has taken responsibility for dealing with the anomalous event will the remaining screens of the point-of-sale terminals unlock.

Similarly, the screen of a point-of-sale terminal may remain in an alert colour, text may remain flashing, or other changes to the user interface of the point-of-sale terminal may remain until a user within the storefront has taken responsibility for dealing with the anomalous event. In this way, ignorance of the alert is more difficult.

Further, in some cases the action may escalate over time until a user has taken responsibility for the anomalous event. For example, a pop up or a change in the colour of text at the point-of-sale terminal may be a first level. The point-of-sale terminal 514 or 516 may be programmed to escalate the actions though if a communication has not been received by the point-of-sale terminal 514 or 516 that someone else is taking responsibility for the anomalous event. For example, after a predetermined time period a further action may be taken. For example, a second level may be a pop up indicating that no one has yet taken responsibility for the enormous event and the user of the point-of-sale terminal may be forced to indicate whether he or she will take responsibility in the pop up window before being allowed to proceed back to the normal checkout screen.

In some cases, the escalation may include locking of the terminals until someone takes responsibility.

As will be appreciated by those skilled in the art, the escalation requires communication between the various point-of-sale terminals. Such communication may be direct or indirect (e.g. via a server). Such communication may utilize the communication subsystems of the point-of-sale terminals and broadcast or direct signals may be sent between such point-of-sale terminals to indicate that a user is taking responsibility for the anomalous event. In the example of FIG. 5, a user of point-of-sale terminal 516 may take responsibility for the anomalous event, and provide an input to point-of-sale terminal 516. Signal 550 may be sent to computing device 512 and signal 552 may be sent to point-of-sale terminal 514 indicating that the user has taken responsibility for the anomalous event.

In some cases, rather than by signal 552, information contained in signal 550 may be distributed by computing device 512 to the point-of-sale terminal 514 (and other point-of-sale terminals and/or devices, not depicted) by subsequent signals (not depicted).

In some cases, rather than a time period expiring, escalation may be based on a signal from another computing device. For example, computing device 512 may see whether someone has taken responsibility and send further signals to the various point-of-sale terminals to indicate that escalation is required if nothing has been received at sensor apparatus 512 to indicate that a user has provided an input to a point-of-sale terminal that responsibility is being assumed for the anomalous event.

In some cases, the action at the point-of-sale terminal 514 or 516 is used instead of audio or visual alerts at the sensor apparatus 510. Specifically, no alarms may sound that are audible to customers of the storefront. This makes the alarm system more discreet. However, in some cases, the action at the point-of-sale terminal may be accompanied by a visual or auditory alarm at the sensor apparatus 510.

Therefore, based on the example of FIG. 5, a sensor apparatus may detect an anomalous event, and provide messages or signals to a server or computing device. Such server or computing device may then direct the signal to various point-of-sale terminals that the anomalous event has occurred. In this case, the point-of-sale terminal may need to act on such signal, and action may be performed at the point-of-sale terminal. Such action may be escalated until someone takes responsibility for the anomalous event in some cases.

While the embodiments of FIGS. 4 and 5 are described separately, in some cases these embodiments may be combined. Specifically, some functionality may be performed by a server or other computing device, while other functionality may use direct communication between a sensor apparatus and one or more point-of-sale terminals.

The above therefore describes methods and systems for loss prevention by providing signals from sensor apparatuses to one or more point-of-sale terminals, when such point-of-sale terminals may perform an action.

In one example, a gate at an exit from a storefront may detect a tag passing through the gate. In this case, the sensor apparatus associated with the gate may send a signal to all point-of-sale terminals within broadcast range, where the signal may provide an identifier for the sensor apparatus and indicate that the tag has been detected.

In this case, each point-of-sale terminal may make a determination on whether to act on the signal. For example, if no one is logged into the point-of-sale terminal, it may ignore the signal. However, if a user with a role in store security is logged in, a determination may be made on that point-of-sale terminal to lock the terminal. Similar decisions may be made on a plurality of point-of-sale terminals.

Once locked, the point-of-sale terminals may stay locked until a user of one of the point-of-sale terminals accepts responsibility for the event, and confirms, using a user interface of the point-of-sale terminal, that the user is taking such responsibility.

A signal may be sent out after someone has taken responsibility to clear the alerts or actions at the other point-of-sale terminals.

Other customers may be unaware of the anomalous event, which may in some cases leave a better impression of the store. Specifically, shoplifting alarms are often implemented as loud sounds and flashing lights, which in some cases may be ineffective or undesirable, and may leave customers with a negative impression of the store. Further, the action or the escalation of the action may require a user to take responsibility for the event, thus ensuring the event is not ignored.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flowchart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above, and combinations thereof may be embodied in computer executable code that, when executing on one or more computing devices, performs the steps thereof. In another aspect, the methods may be embodied in systems that perform the steps thereof and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

The invention claimed is:

1. A loss prevention system comprising:
    a sensor apparatus within the loss prevention system, the sensor apparatus being configured to detect an anomalous event and provide a signal; and
    a group of point-of-sale terminals, wherein at least two point-of-sale terminals from the group of point-of-sale terminals are configured to:
        receive the signal;
        determine that each of the at least two point-of-sale terminals need to act on the signal;
        provide an alert using a user interface of each of the at least two point-of-sale terminals based on determining that the point-of-sale terminal needs to act on the signal;
        receive an input at the user interface of a first point-of-sale terminal of the at least two point-of-sale terminals that responsibility for the signal is being taken;
        send a second signal to others of the at least two point-of-sales terminals; and
        based on the second signal, clear the alert from the others of the at least two point-of-sales terminals.

2. The system of claim 1, wherein the anomalous event is the detection of a tag affixed to an item leaving a designated area.

3. The system of claim 2, wherein the detection of the tag leaving the designated area comprises detection of the tag passing through a defined security gate.

4. The system of claim 1, wherein the signal is a broadcast signal to the group of point-of-sale terminals within range of the signal.

5. The system of claim 1, wherein each of the at least two point-of-sale terminals is configured to determine that the point-of-sale terminal needs to act on the signal based on at least of: a login status of the point-of-sale terminal; a role of a user logged into the point-of-sale terminal; an item type of an item identified in the signal; an item value of an item identified in the signal; or a location identified in the signal.

6. The system of claim 1, wherein the signal is provided to each of the at least two point-of-sale terminals via a server.

7. The system of claim 6, wherein each of the at least two point-of-sale terminals is configured to determine that it needs to act on the signal based on receipt of the signal from the server.

8. The system of claim 1, wherein the at least two point-of-sale terminals receive security camera footage, and where the alert includes displaying security camera footage of the anomalous event.

9. The system of claim 1, wherein the alert is escalated until the input is received by the first point-of-sale terminal.

10. The system of claim 1, wherein the action comprises locking a user interface of each of the at least two point-of-sale terminals until the input is received by another one of the group of point-of-sale terminals indicating a user is taking responsibility for the anomalous event.

11. A method for loss prevention, the method comprising:
    detecting an anomalous event at a sensor apparatus within a loss prevention system;
    providing a signal related to the anomalous event;
    receiving the signal at at least two point-of-sale terminals within a group of point-of-sale terminals, determining, at each of the at least two point-of-sale terminals, that the point-of-sale terminal needs to act on the signal;

provide an alert at a user interface of each of the at least two point-of-sale terminals based on determining that the point-of-sale terminal needs to act on the signal;

receiving an input at the user interface of a first point-of-sale terminal of the at least two point-of-sale terminals that responsibility for the signal is being taken;

sending a second signal to others of the at least two point-of-sales terminals; and based on the second signal, clearing the alert from the others of the at least two point-of-sales terminals.

12. The method of claim 11, wherein the anomalous event is the detection of a tag affixed to an item leaving a designated area.

13. The method of claim 12, wherein the detection of the tag leaving the designated area comprises detection of the tag passing through a defined security gate.

14. The method of claim 11, wherein the determining that the point-of-sale terminal needs to act on the signal is based on at least of: a login status of the point-of-sale terminal; a role of a user logged into the point-of-sale terminal; an item type of an item identified in the signal; an item value of an item identified in the signal; or a location identified in the signal.

15. The method of claim 11, wherein each of the at least two point-of-sale terminals receive security camera footage, and where the alert includes displaying security camera footage of the anomalous event.

16. The method of claim 11, further comprising escalating the alert until the input is received at the user interface of the first point-of-sale terminal.

17. A non-transitory computer readable medium for storing instruction code, which, when executed by a processor in a loss prevention system cause the loss prevention system to:

detect an anomalous event at a sensor apparatus within a loss prevention system;

provide a signal related to the anomalous event;

receive the signal at at least two point-of-sale terminals within a group of point-of-sale terminals;

determine, at each of the at least two point-of-sale terminals, that the point-of-sale terminal needs to act on the signal;

provide an alert using a user interface of each of the at least two point-of-sale terminals based on determining that the point-of-sale terminal needs to act on the signal;

receive an input at the user interface of a first point-of-sale terminal of at the at least two point-of-sale terminals that responsibility for the signal is being taken;

send a second signal to others of the at least two point-of-sales terminals; and based on the second signal, clear the alert from the others of the at least two point-of-sales terminals.

18. The non-transitory computer readable medium of claim 17, wherein the anomalous event is the detection of a tag affixed to an item leaving a designated area.

19. The non-transitory computer readable medium of claim 18, wherein the detection of the tag leaving the designated area comprises detection of the tag passing through a defined security gate.

20. The non-transitory computer readable medium of claim 17, wherein the signal is a broadcast signal to the group of point-of-sale terminals within range of the signal.

* * * * *